United States Patent
Funakoshi et al.

(10) Patent No.: US 8,143,741 B2
(45) Date of Patent: Mar. 27, 2012

(54) ELECTRIC POWER GENERATION CONTROL DEVICE FOR MOTOR VEHICLE

(75) Inventors: Hiroshi Funakoshi, Okazaki (JP); Hidehito Tomonari, Nagoya (JP); Hitoshi Kamura, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 569 days.

(21) Appl. No.: 12/277,033

(22) Filed: Nov. 24, 2008

(65) Prior Publication Data

US 2009/0243489 A1  Oct. 1, 2009

(30) Foreign Application Priority Data

Mar. 28, 2008 (JP) .................................. 2008-086501

(51) Int. Cl.
*B60L 1/14* (2006.01)
(52) U.S. Cl. .......... 307/10.8; 307/10.1; 315/77; 315/78; 315/82; 315/291; 315/307; 320/5; 320/104
(58) Field of Classification Search .................... 315/77, 315/78, 82, 291, 307, 308, 309; 307/10.1, 307/10.8; 320/5, 104
See application file for complete search history.

(56) References Cited

U.S. PATENT DOCUMENTS

| | | | |
|---|---|---|---|
| 5,220,245 A * | 6/1993 | Honda et al. ..................... 315/82 |
| 5,449,996 A * | 9/1995 | Matsumoto et al. ........... 320/148 |
| 5,818,119 A * | 10/1998 | Fukuchi et al. ............... 307/10.1 |
| 5,875,864 A * | 3/1999 | Yano et al. .................. 180/65.25 |
| 5,892,354 A * | 4/1999 | Nagao et al. .................... 323/299 |
| 5,994,787 A * | 11/1999 | Hibino .......................... 307/10.1 |
| 6,791,273 B2 * | 9/2004 | Ito et al. ........................... 315/82 |
| 7,329,966 B2 * | 2/2008 | Konishi ....................... 307/10.1 |
| 2004/0113494 A1 * | 6/2004 | Karuppana et al. .......... 307/10.8 |
| 2006/0097577 A1 * | 5/2006 | Kato et al. .................... 307/10.1 |
| 2007/0182248 A1 * | 8/2007 | Blaker et al. ................. 307/10.1 |
| 2008/0053715 A1 * | 3/2008 | Suzuki et al. ................... 180/2.1 |
| 2008/0100139 A1 * | 5/2008 | Michiyama et al. ......... 307/10.8 |
| 2009/0069950 A1 * | 3/2009 | Kurokami et al. ............ 700/291 |

FOREIGN PATENT DOCUMENTS

| | | |
|---|---|---|
| JP | 63-227436 A | 9/1988 |
| JP | 63-234846 A | 9/1988 |
| JP | 05-162582 A | 6/1993 |
| JP | 2005-086968 A | 3/2005 |
| JP | 3931481 B2 | 3/2007 |
| JP | 2007-116766 A | 5/2007 |

* cited by examiner

*Primary Examiner* — Douglas W Owens
*Assistant Examiner* — Thai Pham
(74) *Attorney, Agent, or Firm* — Birch, Stewart, Kolasch & Birch, LLP (57) ABSTRACT

An electric power generation control device for a motor vehicle is provided which ensures a satisfactory regenerative effect without entailing flickering of or reduction in life of headlights even if the headlights are turned on at all times. The electric power generation control device lowers the power generation voltage of an alternator when the electricity storage amount of a battery is at or above a predetermined level. While lighting of a headlight bulb is detected, lowering of the power generation voltage is restrained if the state of sunlight is equivalent to nighttime, and the power generation voltage is allowed to be lowered if the sunlight state is equivalent to daytime.

5 Claims, 10 Drawing Sheets

ELECTRIC POWER GENERATION CONTROL DEVICE FOR MOTOR VEHICLE

BACKGROUND OF THE INVENTION

1. Field of the Invention

The present invention relates to electric power generation control devices for motor vehicles, and more particularly, to techniques for controlling the power generation voltage of an electric power generator in a vehicle equipped with headlights.

2. Description of the Related Art

Generally, a motor vehicle is equipped with an electric generator (alternator) as a source of electric power to be supplied to electrical devices such as headlights. The vehicle is also provided with a battery (electricity storage means) so that electric power may be supplied from the battery to the electrical devices. Further, the electric generator has the function of charging the battery of which the stored electricity is consumed as the electric power is supplied to the electrical devices. The power generation voltage of the electric generator is controlled so that the charged capacity of the battery may become greater than or equal to a target value (target charged capacity). In this type of vehicle, energy regeneration is often carried out. Specifically, during the deceleration, kinetic energy is converted to electric energy to be stored in the battery, and the energy stored in the battery is used during the time other than the deceleration, thereby saving energy. To improve the regeneration efficiency, preferably, the target charged capacity is set low so that the charged capacity of the battery may be as low as possible, and during the deceleration, the power generation voltage is set high.

Japanese Patent No. 3931481 discloses a control device wherein, when an electrical device that consumes much electric power, such as the headlights or the motor of an electric power steering system, is used, the power generation voltage of the electric generator is varied in accordance with the required load of the electrical device.

Meanwhile, the life of the headlight bulb of a vehicle is closely related with the supply voltage applied to the headlight bulb and is inversely proportional, for example, to the 12th to 13th power of the ratio of the supply voltage to the rated voltage. Also, if the supply voltage of the headlight bulb fluctuates, the illuminance of the headlight varies and thus the headlight flickers, making the driver and the people around the vehicle feel uncomfortable. Accordingly, even if the power generation voltage is varied as disclosed in the above patent, the variable range has to be restricted in order to prevent reduction in life of the headlight bulb as well as flickering of the headlight. Especially in far-north regions, it is often the case that the headlights must be turned on even in the daytime, and the variable range of the power generation voltage has to be restricted at all times in such regions. Consequently, only a limited regenerative effect is available, resulting in lowering in fuel efficiency.

SUMMARY OF THE INVENTION

The present invention was made to solve the above problems, and an object thereof is to provide an electric power generation control device for a motor vehicle, which device is capable of ensuring a satisfactory regenerative effect without entailing flickering of or reduction in life of headlights even if the headlights are turned on at all times.

To achieve the object, the present invention provides an electric power generation control device driven by an internal combustion engine mounted on a motor vehicle, for generating electric power and determining a power generation voltage for supplying the electric power to an electrical load and electricity storage means of the vehicle. The electric power generation control device comprises: electricity storage amount detection means for detecting an amount of electricity stored in the electricity storage means; power generation voltage decreasing means for lowering the power generation voltage when a predetermined electricity storage amount is detected by the electricity storage amount detection means; lighting detection means for detecting lighting of a headlight bulb of the vehicle; sunlight state detection means for detecting a state of sunlight; and control means for restraining the power generation voltage from being lowered by the power generation voltage decreasing means if the sunlight state detected by the sunlight state detection means is equivalent to nighttime while lighting of the headlight bulb is detected by the lighting detection means, and allowing the power generation voltage to be lowered by the power generation voltage decreasing means if the sunlight state detected by the sunlight state detection means is equivalent to daytime while lighting of the headlight bulb is detected by the lighting detection means.

With the electric power generation control device constructed as above, in the nighttime with the headlight bulb turned on, lowering of the power generation voltage by the power generation voltage decreasing means is restrained, thereby reducing fluctuation of the supply voltage applied to the headlight bulb. It is therefore possible to restrain flickering of the headlight as well as reduction in life of the headlight bulb. While the headlight bulb is turned on in the daytime, on the other hand, the power generation voltage is allowed to be lowered by the power generation voltage decreasing means. Thus, in regions where the headlights must always be turned on, such as far-north regions, the charged capacity of the electricity storage means can be kept low with the target charged capacity set to a low level, making it possible to take full advantage of the regenerative effect at the time of charging.

Preferably, the electric power generation control device of the present invention further comprises: vehicle running state detection means for detecting a running state of the vehicle; power generation voltage increasing means for raising the power generation voltage when the running state detected by the vehicle running state detection means is a decelerating state; and supply power restraining means for restraining electric power supplied to the headlight bulb, wherein, when the sunlight state detected by the sunlight state detection means is equivalent to nighttime, the control means restrains the power generation voltage from being raised by the power generation voltage increasing means, and when the sunlight state detected by the sunlight state detection means is equivalent to daytime, the control means allows the power generation voltage to be raised by the power generation voltage increasing means and also causes the supply power restraining means to restrain the electric power supplied to the headlight bulb.

In the preferred electric power generation control device, since in the nighttime, increase of the power generation voltage by the power generation voltage increasing means is restrained, fluctuation of the supply voltage applied to the headlight bulb is reduced, making it possible to restrain flickering of the headlight as well as reduction in life of the headlight bulb. In the daytime, on the other hand, the power generation voltage is allowed to rise, whereby the regenerative effect can be enhanced and also the power consumption of the headlight bulb can be restrained by the supply power restraining means.

Preferably, in the electric power generation control device of the present invention, the supply power restraining means performs chopper control in a time-divided fashion, and the control means controls the supply power restraining means in accordance with the power generation voltage such that a duty ratio of the chopper control is varied.

In the preferred electric power generation control device, the duty ratio of the chopper control is varied in accordance with the power generation voltage. Accordingly, the electric power supplied to the headlight bulb can be controlled to a fixed level according to the power generation voltage, making it possible to prevent flickering of the headlight without fail.

Preferably, the electric power generation control device of the present invention further comprises temperature detection means for detecting temperature of the headlight bulb, wherein, when the detected temperature of the headlight bulb is lower than a predetermined value, the control means controls the supply power restraining means such that the electric power supplied to the headlight bulb is decreased over a predetermined time from the start of power supply.

In the preferred electric power generation control device, if the temperature of the headlight bulb is lower than the predetermined value, the supply power is decreased over the predetermined time from the start of power supply. Accordingly, the temperature of the headlight bulb is prevented from rising rapidly, thus making it possible to more effectively restrain reduction in life of the headlight bulb.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below with reference to FIGS. 1 through 10.

Figure 1:
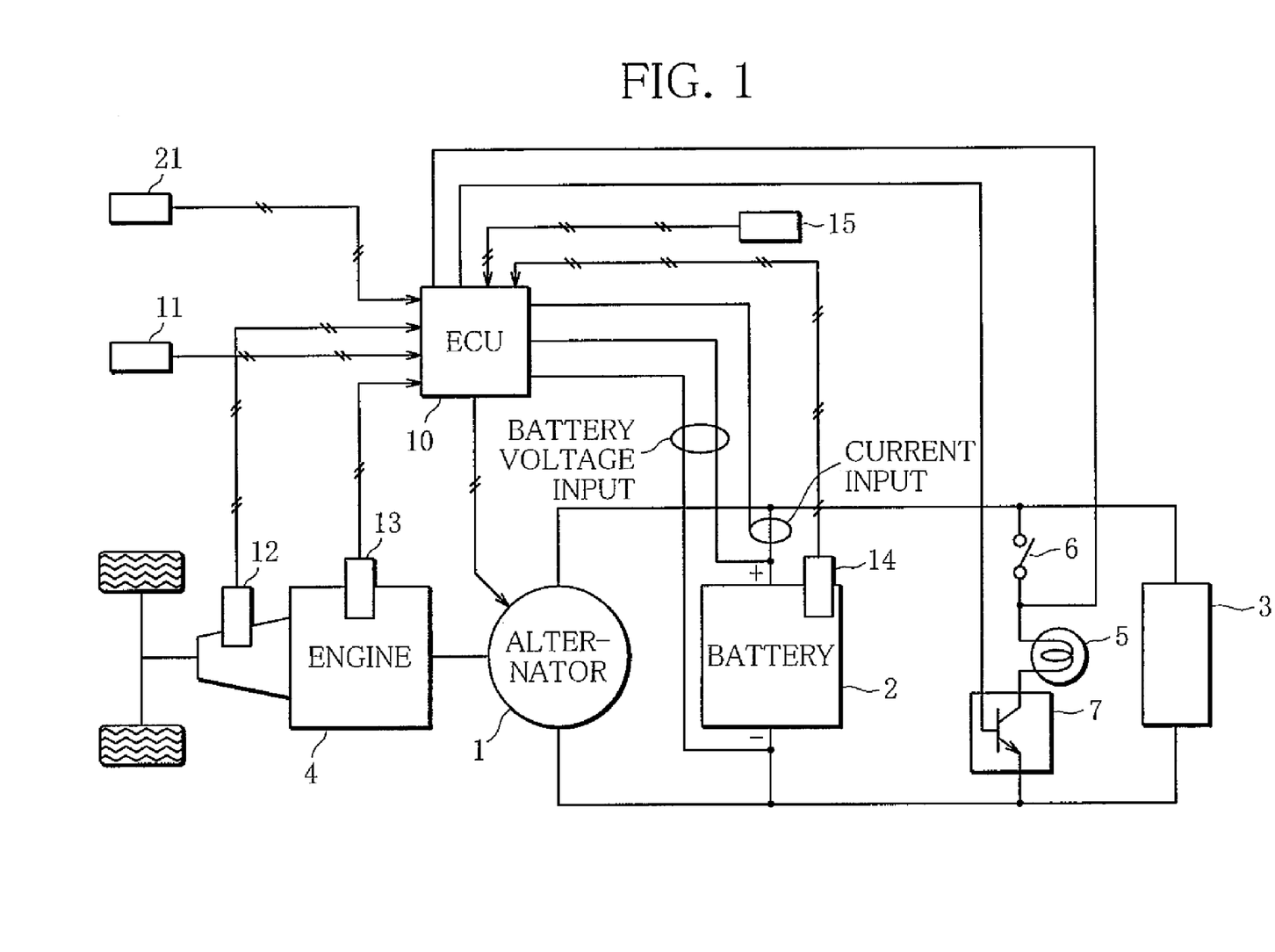
FIG. 1 illustrates a schematic construction of an electric power generation control device for a motor vehicle in accordance with one embodiment of the present invention.
Figure 2:
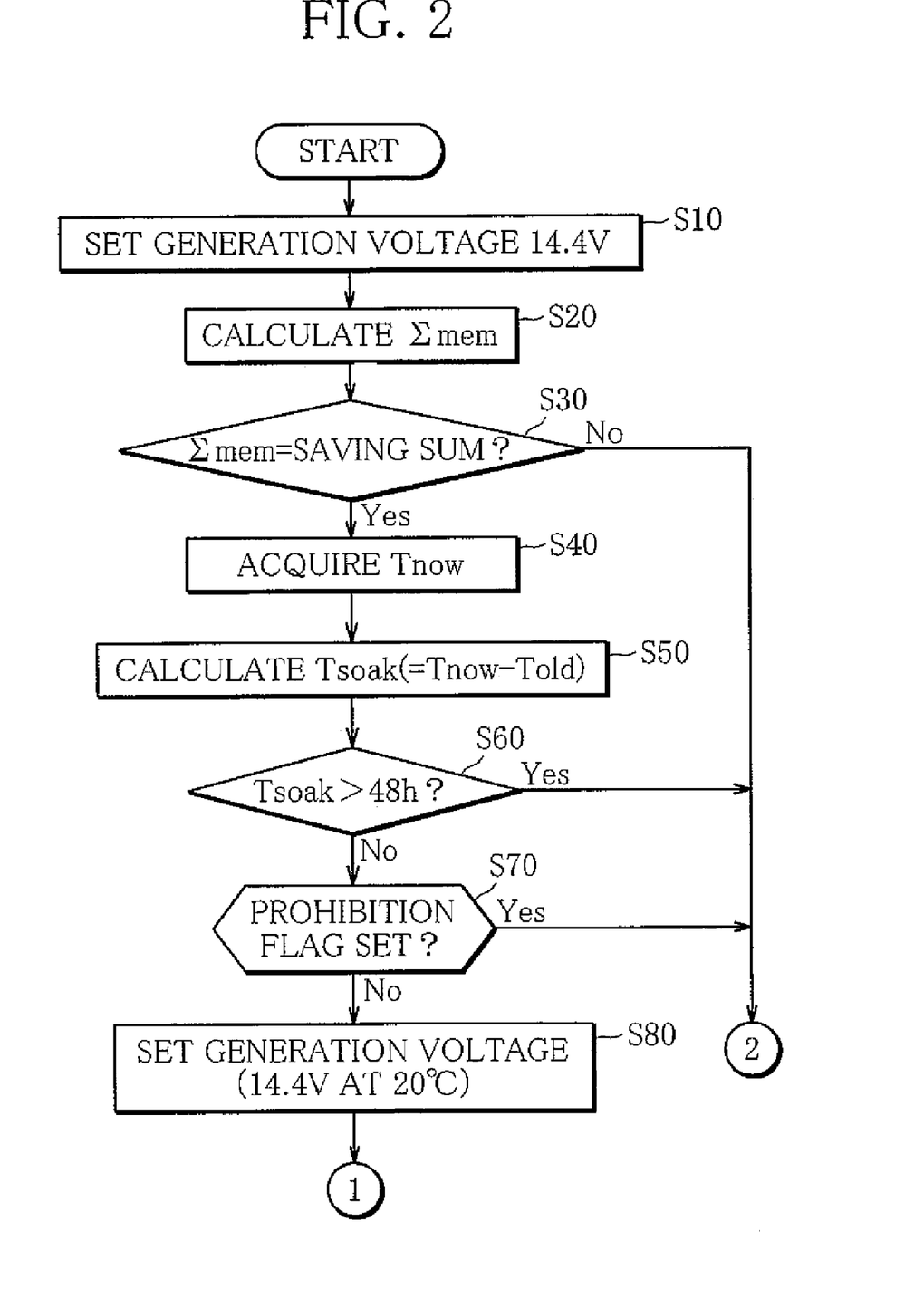
FIG. 2 is a flowchart illustrating a procedure for controlling a power generation voltage of an alternator.
Figure 3:
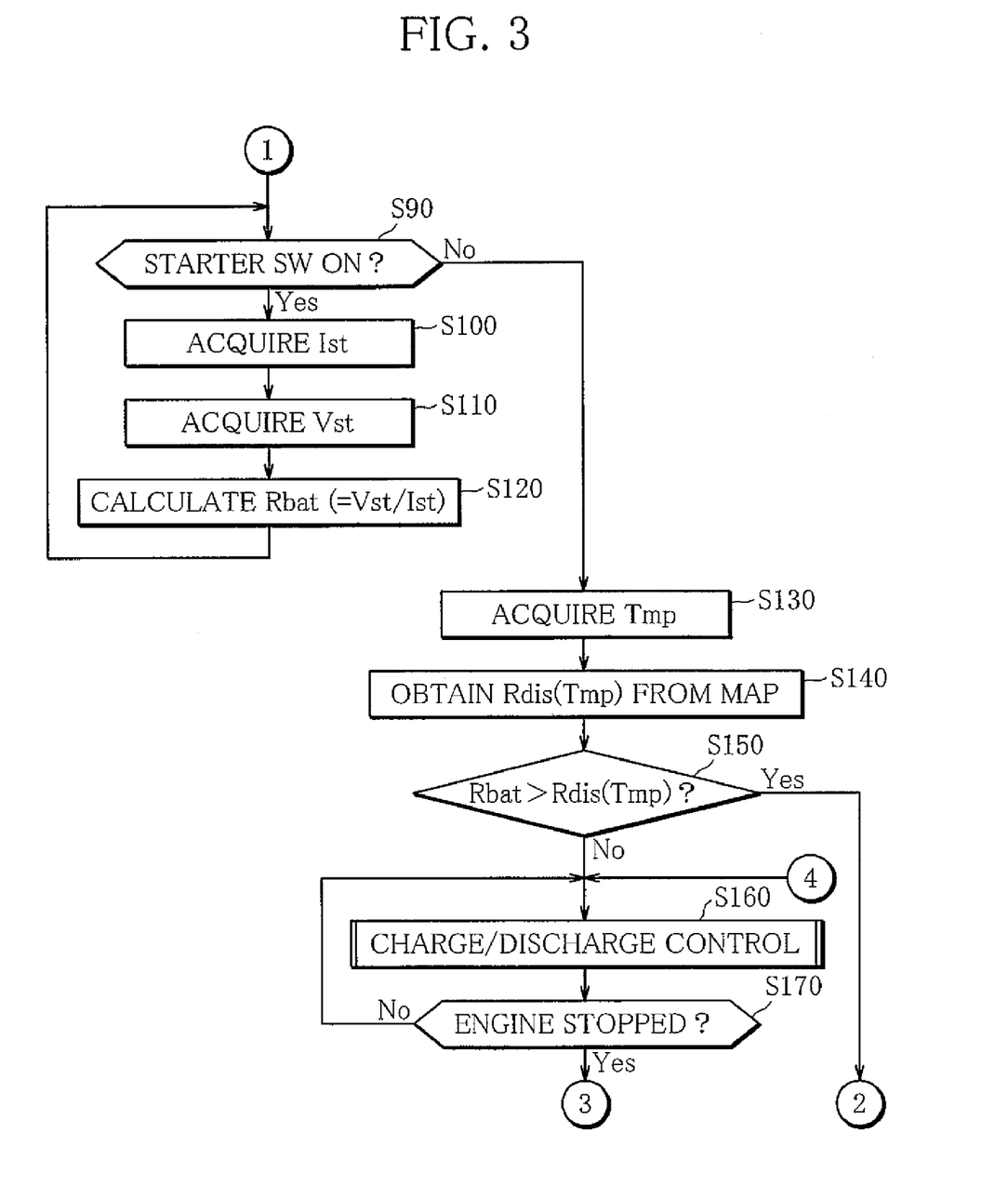
FIG. 3 is a flowchart also illustrating the power generation voltage control procedure for the alternator.
Figure 4:
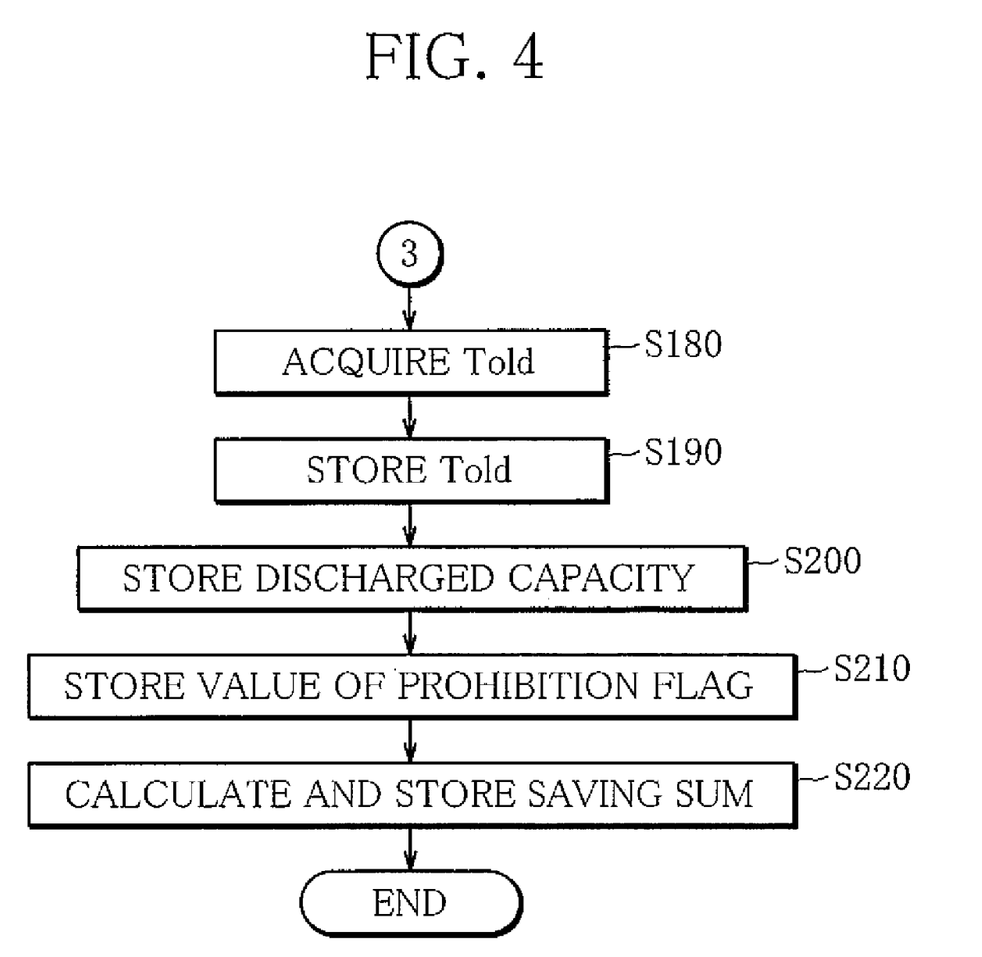
FIG. 4 is a flowchart illustrating the power generation voltage control procedure for the alternator.
Figure 5:
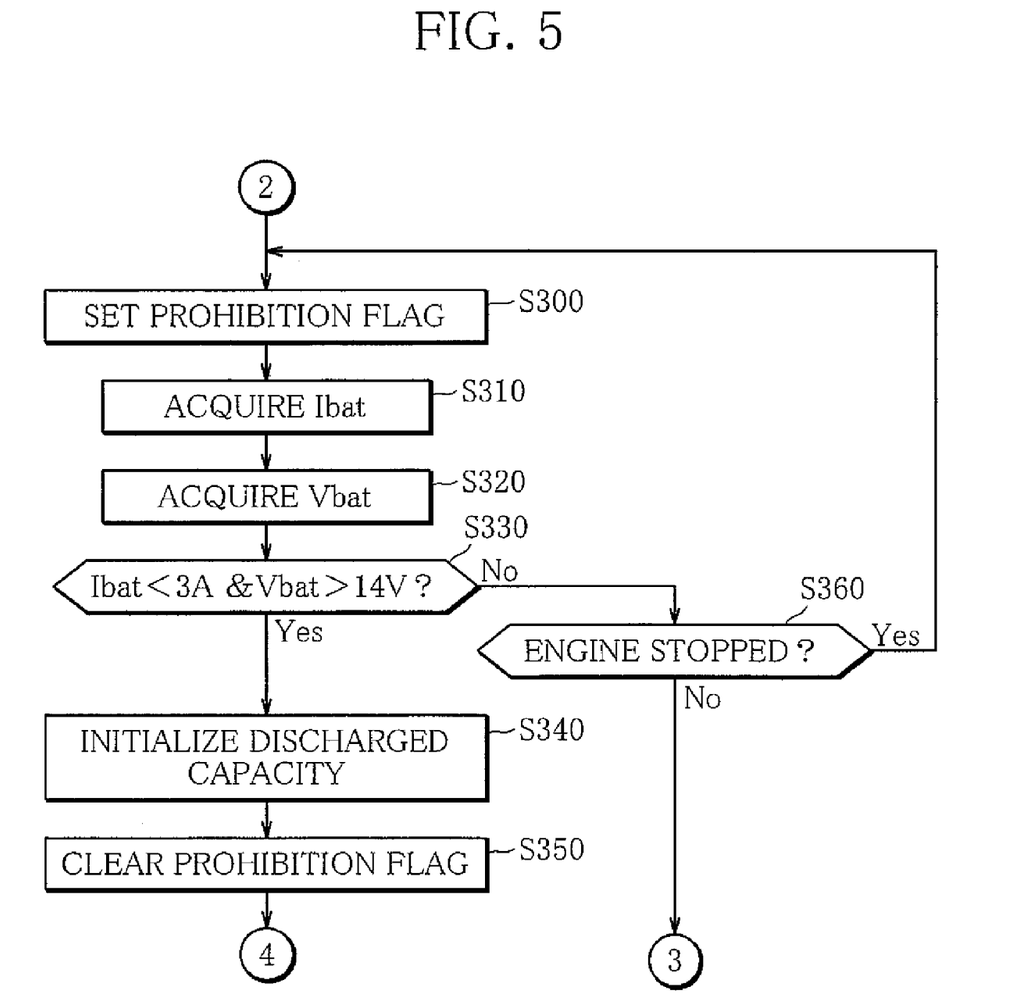
FIG. 5 is a flowchart illustrating the power generation voltage control procedure for the alternator.

FIG. 1 illustrates a schematic construction of an electric power generation control device for a motor vehicle in accordance with the embodiment.

As shown in FIG. 1, a motor vehicle on which the electric power generation control device of the embodiment is mounted is equipped with an alternator (electric power generation means) 1 and a battery (electricity storage means) 2 as power supply equipment. The alternator 1 is electrically connected with a headlight bulb 5, other electrical devices (automotive electrical loads) 3 and the battery 2 in parallel with one another. The alternator 1 is driven by an engine (internal combustion engine) 4 for moving the vehicle, to generate electricity, the generated electric power being supplied to the headlight bulb 5 and the electrical devices 3 and also to the battery 2 to charge same.

The headlight bulb 5 is turned on and off by a headlight switch 6 connected in series therewith and is also subjected to intermittent ON-OFF control by chopper control means (supply power restraining means) 7 comprising a switching element.

The vehicle is provided with a solar radiation sensor (sunlight state detection means) 21 for detecting a sunlight state. For the solar radiation sensor 21, a sensor for automatically turning on the headlight bulb, an illuminance sensor associated with an automotive air conditioner, or a sensor associated with the supply power restraining means may be sued.

An ECU (control means) 10 includes input/output devices, storage devices (ROM, RAM, nonvolatile RAM, etc.), a central processing unit (CPU), and a timepiece. The ECU 10 is input with information detected by various sensors including an accelerator pedal sensor 11 for detecting the position of an accelerator pedal, a vehicle speed sensor (vehicle running state detection means) 12, an engine speed sensor 13, a battery temperature sensor 14 and the solar radiation sensor 21, as well as with an operation signal from a starter switch 15 of the engine 4, and a voltage and charging current of the battery 2.

The output side of the ECU 10 is connected to the alternator 1 and the chopper control means 7. The ECU 10 outputs a control signal to the alternator 1 to control its power generation voltage, and also sends a control signal to the chopper control means 7 to subject the headlight bulb 5 to chopper control.

FIGS. 2 through 5 are flowcharts illustrating a procedure for controlling the power generation voltage of the alternator 1 by the ECU 10. The illustrated routine is executed upon start of the engine.

First, in Step S10, a control signal is output to the alternator 1 to set the power generation voltage to 14.4 V. Step S20 is then executed to calculate a backup memory area sum Σmem corresponding to the amount of usage of a backup memory, described later. Subsequently, in Step S30, it is determined whether or not the sum Σmem calculated in Step S20 is equal to a saving sum, described later. If the sum Σmem is equal to the saving sum, the routine proceeds to Step S40.

In Step S40, a current time Tnow is acquired from the timepiece, and the routine proceeds to Step S50. In Step S50, a soak time (vehicle standing time) Tsoak is calculated from the current time Tnow acquired in Step S40 and a previous engine stop time Told stored in Step S190, explained later. Specifically, the soak time is calculated according to Tsoak=Tnow−Told. Subsequently, in Step S60, it is determined whether or not the soak time Tsoak calculated in Step S50 is longer than 48 hours. If the soak time is not longer than 48 hours, the routine proceeds to Step S70.

In Step S70, it is determined whether or not a power generation voltage decrease prohibition flag, described later, has been set (whether the flag is "1" or not). If the generation voltage decrease prohibition flag is not set, the routine proceeds to Step S80, wherein a control signal is output to the alternator 1 so that the power generation voltage may become equal to 14.4 V. The power generation voltage 14.4 V is a reference voltage that is applied when the battery temperature is 20° C. In practice, therefore, the power generation voltage is increased or decreased from 14.4 V in accordance with the detected battery temperature input from the battery temperature sensor 14. The routine then proceeds to Step S90.

In Step S90, it is determined whether or not the starter switch (SW) 15 of the engine 4 is ON. If the starter switch 15 is ON, the routine proceeds to Step S100 to acquire a starting battery current Ist. Then, in Step S110, a starting battery voltage Vst is acquired, and the routine proceeds to Step S120. In Step S120, a battery internal resistance Rbat is calculated from the starting battery current Ist read in Step S100 and the starting battery voltage Vst read in Step S110. Specifically, the internal resistance is calculated according to Rbat=Vst/Ist. After executing Step S120, the routine returns to Step S90.

On the other hand, if it is judged in Step S90 that the starter switch of the engine 4 is not ON, the routine proceeds to Step S130. In Step S130, the battery temperature Tmp is acquired from the battery temperature sensor 14, and then in Step S140, an internal resistance Rdis(Tmp) for discriminating discharge is calculated. Specifically, using the battery temperature Tmp read in Step S130, a map prepared beforehand is searched to obtain a corresponding discharge-discriminating internal resistance Rdis(Tmp).

Subsequently, in Step S150, it is determined whether or not the battery internal resistance Rbat calculated in Step S120 is higher than the discharge-discriminating internal resistance Rdis(Tmp) calculated in Step S140. If it is judged that the battery internal resistance Rbat is not higher than the discharge-discriminating internal resistance Rdis(Tmp), that is, if the former is judged to be lower than or equal to the latter, the routine proceeds to Step S160.

In Step S160, a subroutine for a charge/discharge control process, described later, is executed, and the routine proceeds to Step S170. In Step S170, an engine rotation speed is acquired from the engine speed sensor 13 to determine whether or not the engine 4 is stopped. If the engine is stopped, the routine proceeds to Step S180; if not, the routine returns to Step S160.

In Step S180, a current time Told is acquired from the timepiece, and then in Step S190, the current time Told acquired in Step S180 is stored in the backup memory as the engine stop time Told. Subsequently, in Step S200, a discharged capacity "new", explained later, is stored in the backup memory, and the routine proceeds to Step S210. In Step S210, the value of the generation voltage decrease prohibition flag is stored in the backup memory. Then, in Step S220, the saving sum is calculated and stored in the backup memory. Specifically, the saving sum is calculated by adding up all address values assigned to the backup memory, whereupon the routine ends.

The routine proceeds to Step S300 when it is judged in Step S30 that the backup memory area sum Σmem is not equal to the saving sum, or when it is judged in Step S60 that the soak time Tsoak is longer than 48 hours, or when it is judged in Step S70 that the generation voltage decrease prohibition flag is being set, or when it is judged in Step S150 that the battery internal resistance Rbat is higher than the discharge-discriminating internal resistance Rdis(Tmp).

In Step S300, the generation voltage decrease prohibition flag is set to "1" (ON) (generation voltage decrease prohibiting means). Then, in Step S310 a battery current Ibat is acquired, and in Step S320, a battery voltage Vbat is acquired.

Subsequently, in Step S330, it is determined whether or not the battery current Ibat acquired in Step S310 is smaller than 3 A and at the same time the battery voltage Vbat acquired in Step S320 is higher than 14 V. If the battery current Ibat is smaller than 3 A and at the same time the battery voltage Vbat is higher than 14 V, the routine proceeds to Step S340. In Step S340, an initial value is substituted for the discharged capacity "new" of the battery 2, and the routine proceeds to Step S350, wherein the generation voltage decrease prohibition flag is cleared to "0" (OFF) The routine then proceeds to Step S160.

If it is judged in Step S330 that the battery current Ibat is larger than or equal to 3 A or that the battery voltage Vbat is lower than or equal to 14 V, the routine proceeds to Step S360. In Step S360, the engine rotation speed is acquired from the engine speed sensor 13 and a determination is made as to whether or not the engine 4 is stopped. If the engine is stopped, the routine returns to Step S300; if not, the routine proceeds to Step S180.

Figure 6:
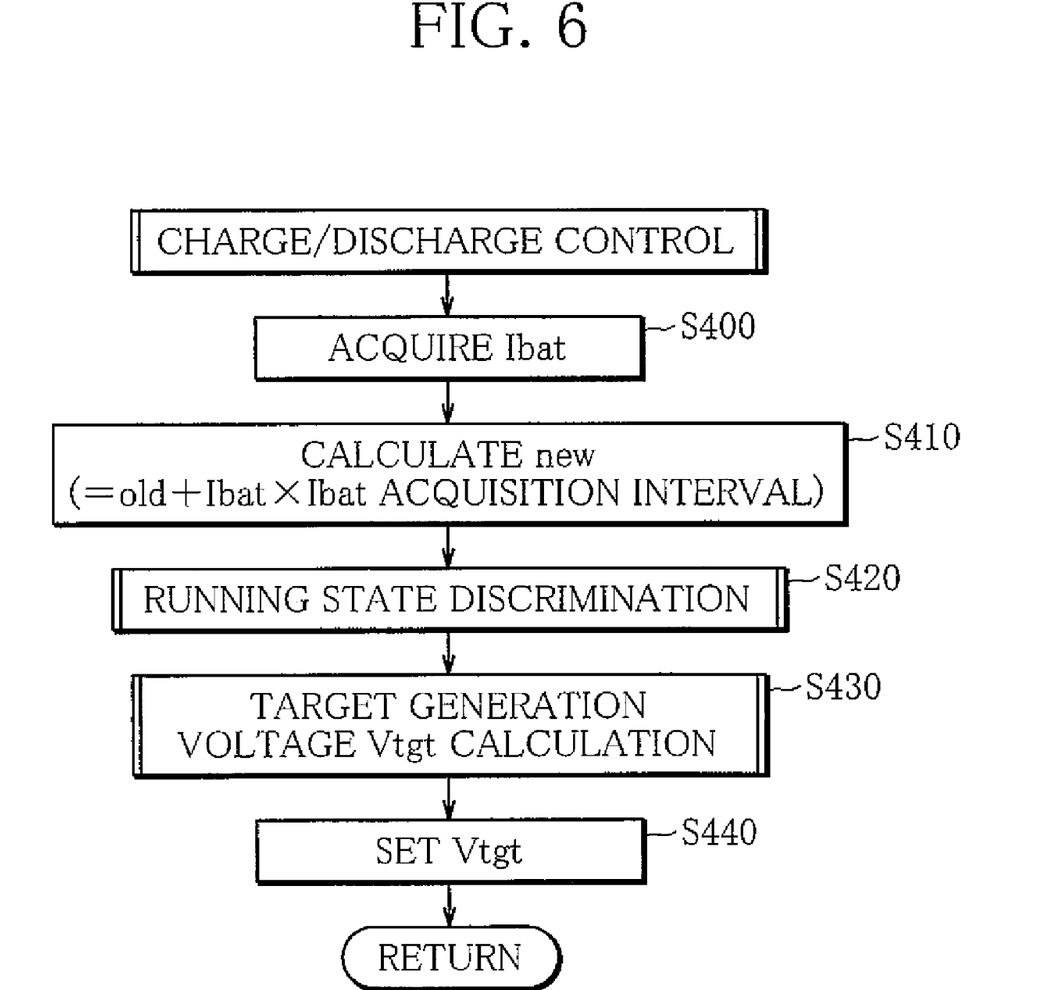
FIG. 6 is a flowchart illustrating a subroutine for a charge/discharge control process.

FIG. 6 is a flowchart illustrating a subroutine for the charge/discharge control process executed in Step S160 of the main routine.

Upon start of the subroutine, first, the battery current Ibat is acquired in Step S400. Then, in Step S410, the discharged capacity "new" of the battery 2 is calculated according to the following equation (1):

$$\text{Discharged Capacity "new"} = \text{Discharged Capacity "old"} + I_{bat} \times I_{bat} \text{ Acquisition Interval} \quad (1)$$

where the discharged capacity "old" is a previously calculated discharged capacity and is read from the backup memory, Ibat is the battery current acquired in Step S400, and the Ibat acquisition interval corresponds to a time period from the previous calculation of the discharged capacity "old" to the present acquisition of the battery current Ibat. The discharged capacity "old" is an index used in the present invention as indicative of the electricity storage amount, and Step S410 corresponds to electricity storage amount detection means of the present invention. The subroutine then proceeds to Step S420.

In Step S420, a running state discrimination subroutine, described below, is executed, and then in Step S430, a target generation voltage Vtgt calculation subroutine, also described later, is executed. In Step S440, a control signal is output to the alternator 1 so that a target generation voltage Vtgt calculated in Step S430 may be set as the power generation voltage, whereupon the subroutine ends and the process returns to the main routine.

Figure 7:
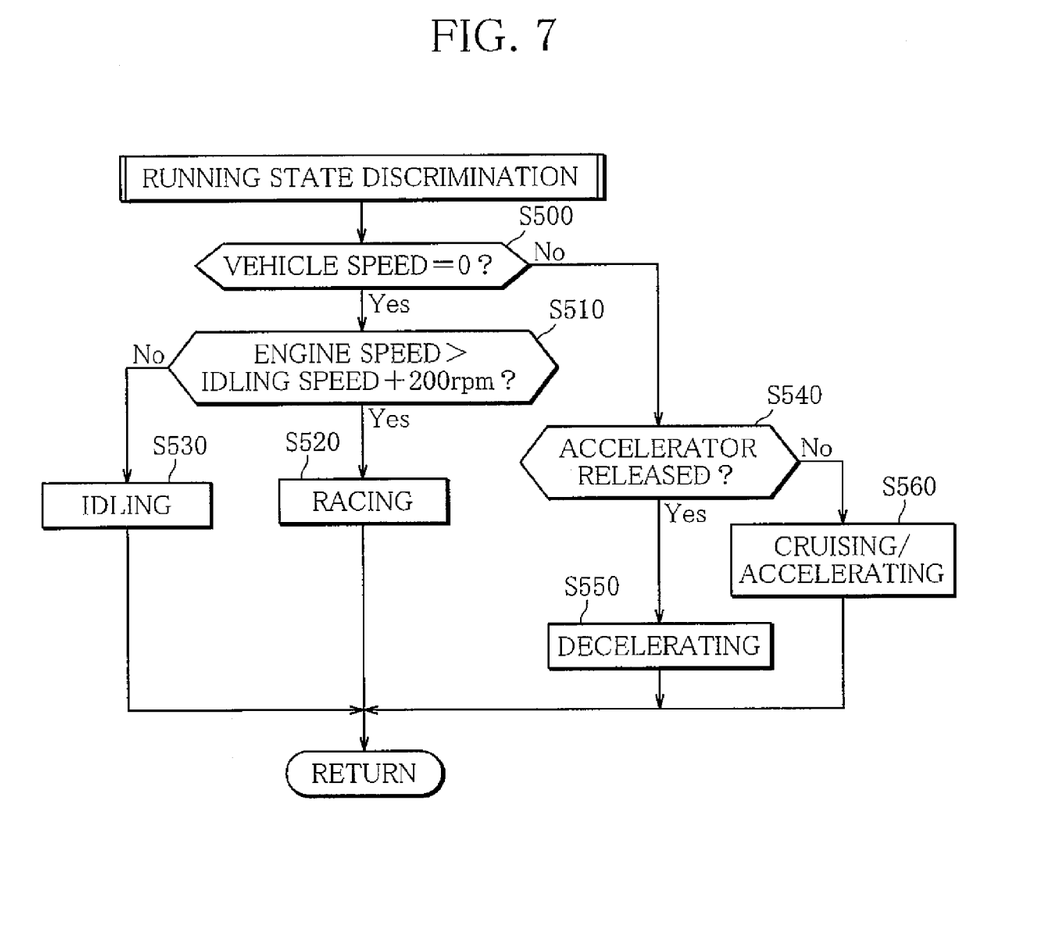
FIG. 7 is a flowchart illustrating a subroutine for a running state discrimination process.

FIG. 7 is a flowchart illustrating the running state discrimination subroutine executed in Step S420 of the aforementioned charge/discharge control subroutine.

Upon start of the running state discrimination subroutine, first in Step S500, the vehicle speed is acquired from the vehicle speed sensor 12 and a determination is made as to whether or not the vehicle speed is zero ("0") If the vehicle speed is "0", the subroutine proceeds to Step S510.

In Step S510, it is determined whether or not the engine rotation speed acquired from the engine speed sensor 13 is higher than the sum of a preset idling speed and 200 rpm. If the sum of the idling speed and 200 rpm is exceeded, the subroutine proceeds to Step S520 in which the engine 4 is judged to be in a racing state, whereupon the subroutine ends. If it is judged in Step S510 that the engine rotation speed is lower than or equal to the sum of the idling speed plus 200 rpm, the subroutine proceeds to Step S530 in which the engine 4 is judged to be in an idling state, whereupon the subroutine ends.

If it is judged in Step S500 that the vehicle speed is not "0", it is determined in Step S540 whether the accelerator pedal is released or not on the basis of the output from the accelerator pedal sensor 11. If it is judged that the accelerator pedal 11 is released, the subroutine proceeds to Step S550 in which the vehicle is judged to be in a decelerating state, whereupon the subroutine ends. On the other hand, if it is judged in Step S540 that the accelerator pedal is not released, the subroutine proceeds to Step S560 in which the vehicle is judged to be in a cruising or accelerating state, whereupon the subroutine ends.

Figure 8:
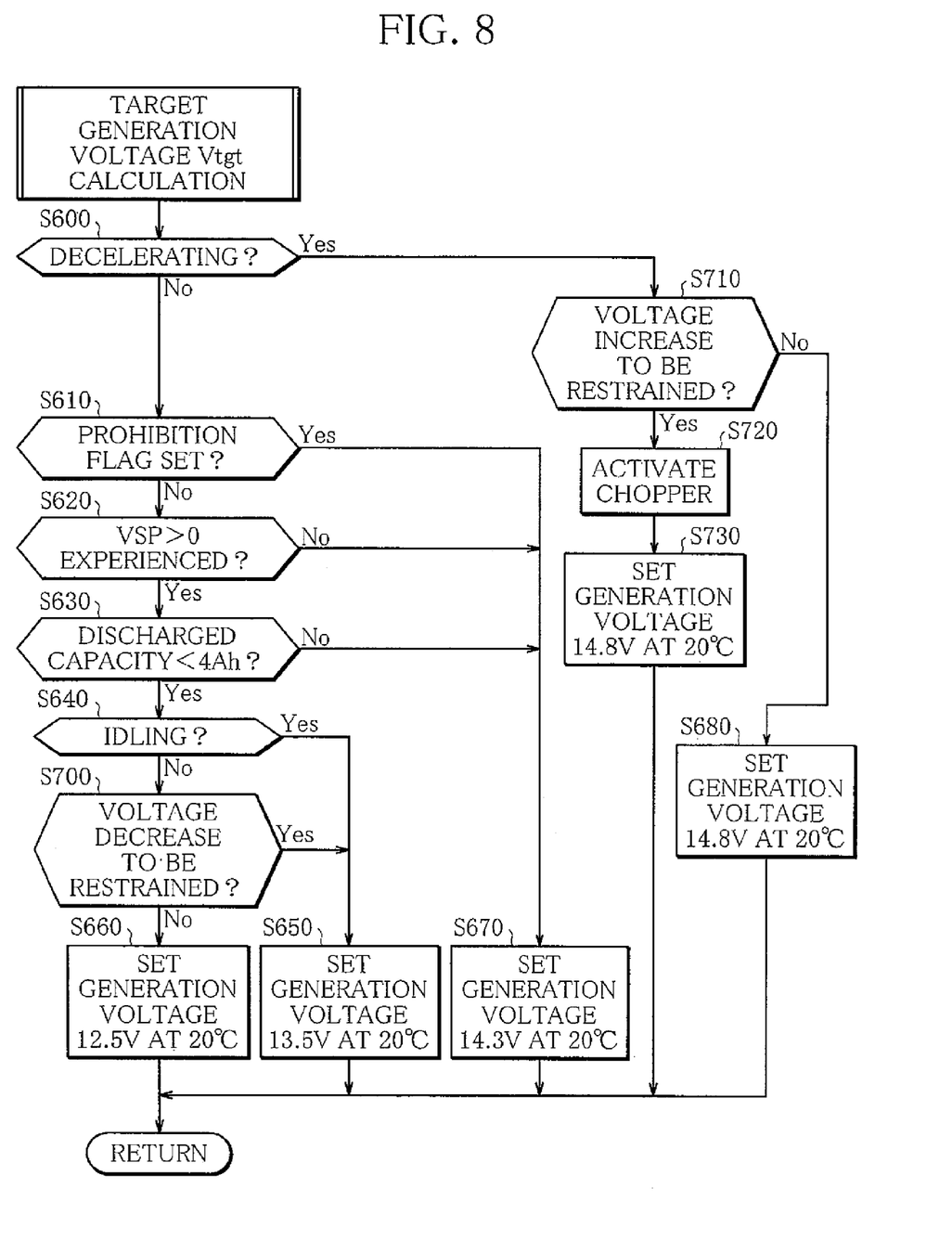
FIG. 8 is a flowchart illustrating a subroutine for a target generation voltage calculation process.

FIG. 8 is a flowchart illustrating the target generation voltage Vtgt calculation subroutine executed in Step S430 of the charge/discharge control subroutine.

Upon start of the calculation subroutine, first in Step S600, it is determined whether or not the state discriminated in the running state discrimination subroutine is the decelerating state. If the discriminated state is not the decelerating state, the subroutine proceeds to Step S610, where it is determined whether the generation voltage decrease prohibition flag has been set or not (whether the flag value is "1" or not). If the generation voltage decrease prohibition flag is not set, the subroutine proceeds to Step S620.

In Step S620, it is determined whether or not a vehicle speed VSP higher than "0" has been experienced even once after the start of the engine. If the state VSP>0 has been experienced even once after the engine start, that is, if the vehicle has been run even once after the engine start, the subroutine proceeds to Step S630. In Step S630, it is determined whether or not the discharged capacity "new" calculated in Step S410 is smaller than 4 Ah. If the discharged capacity "new" is smaller than 4 Ah, the subroutine proceeds to Step S640.

In Step S640, it is determined whether or not the state discriminated in the running state discrimination subroutine is the idling state. If the discriminated state is the idling state, the subroutine proceeds to Step S650. In Step S650, a control signal is output to the alternator 1 so that the reference power generation voltage at the battery temperature 20° C. may be set to 13.5 V, whereupon the subroutine ends.

If it is judged in Step S640 that the discriminated state is not the idling state, the subroutine proceeds to Step S700. In Step S700, a subroutine for determining activation of generation voltage decrease restraining means, described later, is executed, and if the generation voltage decrease restraining means is judged to be active, the subroutine proceeds to Step S650. If it is judged that the generation voltage decrease restraining means is not active, the subroutine proceeds to Step S660. In Step S660, a control signal is output to the alternator 1 so that the reference power generation voltage at the battery temperature 20° C. may be set to 12.5 V, whereupon the subroutine ends. Steps S630, S650 and S660 correspond to power generation voltage decreasing means.

The subroutine proceeds to Step S670 when it is judged in Step S610 that the generation voltage decrease prohibition flag is set, or when it is judged in Step S620 that the state VSP>0 has not been experienced yet, or when it is judged in Step S630 that the discharged capacity "new" is greater than or equal to 4 Ah. In Step S670, a control signal is output to the alternator 1 so that the reference power generation voltage at the battery temperature 20° C. may be set to 14.3 V, whereupon the subroutine ends.

If it is judged in Step S600 that the discriminated state is the decelerating state, the subroutine proceeds to Step S710. In Step S710, a subroutine for determining activation of generation voltage increase restraining means, described later, is executed, and if the generation voltage increase restraining means is judged to be active, the subroutine proceeds to Step S720. In Step S720, the chopper control means 7 is instructed to subject the headlight bulb to chopper control. Specifically, the headlight bulb is driven with the duty ratio of the chopper control set at 50%. Then, in Step S730, a control signal is output to the alternator 1 so that the reference power generation voltage at the battery temperature 20° C. may be set to 14.8 V, whereupon the subroutine ends.

If it is judged in Step S710 that the generation voltage increase restraining means is not active, the subroutine proceeds to Step S680. In Step S680, a control signal is output to the alternator 1 so that the reference power generation voltage at the battery temperature 20° C. may be set to 14.8 V, whereupon the subroutine ends. Steps S600, S680 and S730 correspond to power generation voltage increasing means of the present invention.

Figure 9:
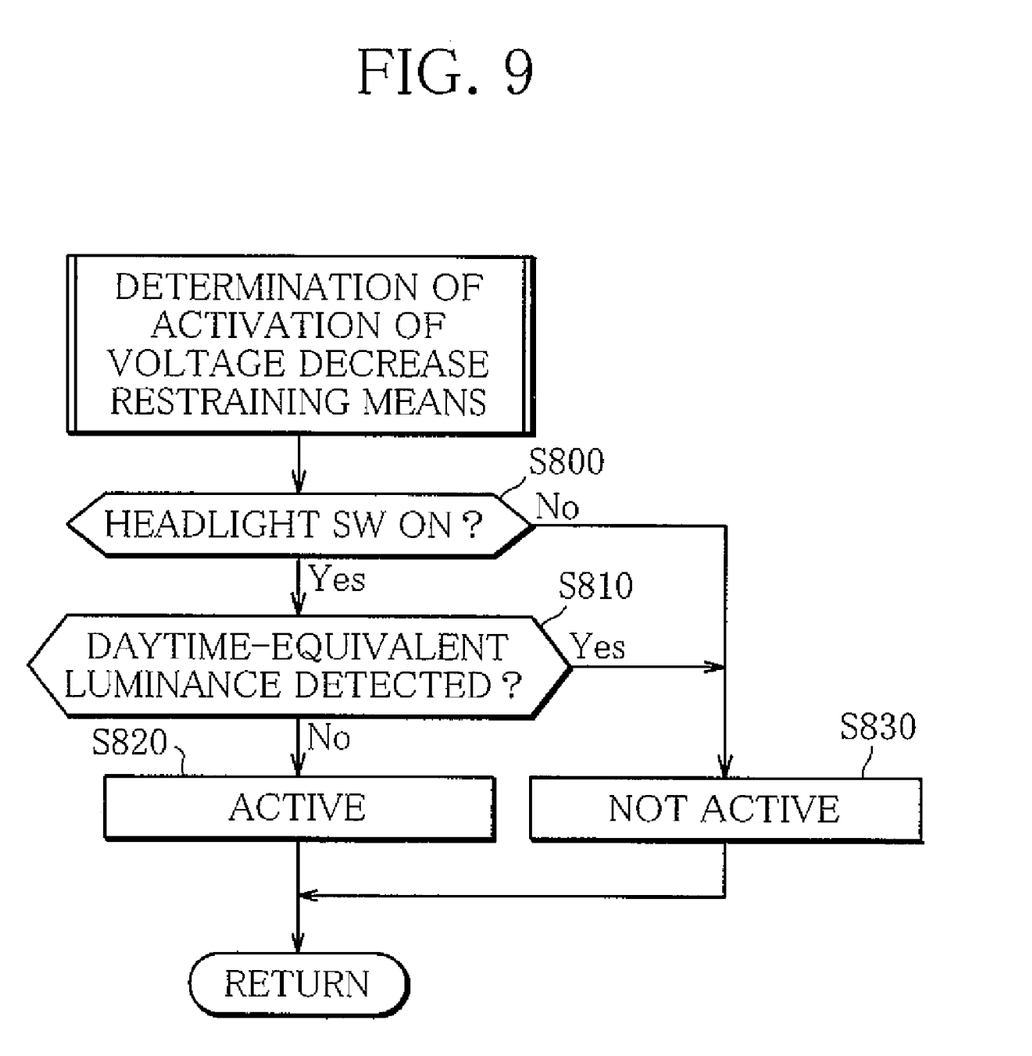
FIG. 9 is a flowchart illustrating a subroutine for determining activation of generation voltage decrease restraining means.

FIG. 9 is a flowchart illustrating the subroutine for determining activation of the generation voltage decrease restraining means.

Upon start of the subroutine, it is determined in Step S800 whether or not the headlight switch 6 is ON. If the headlight switch 6 is ON, the subroutine proceeds to Step SS10. In Step S810, an amount of solar radiation is acquired from the solar radiation sensor 21, and a determination is made as to whether or not the acquired solar radiation shows a daytime-equivalent luminance. If the solar radiation does not show a daytime-equivalent luminance (the solar radiation shows a nighttime-equivalent luminance), the subroutine proceeds to Step S820 in which the generation voltage decrease restraining means is judged to be active, whereupon the subroutine ends.

The subroutine proceeds to Step S830 when it is judged in Step S800 that the headlight switch 6 is OFF, or when it is judged in Step S810 that the acquired solar radiation shows a daytime-equivalent luminance. In Step S830, the generation voltage decrease restraining means is judged to be inactive, whereupon the subroutine ends.

Figure 10:
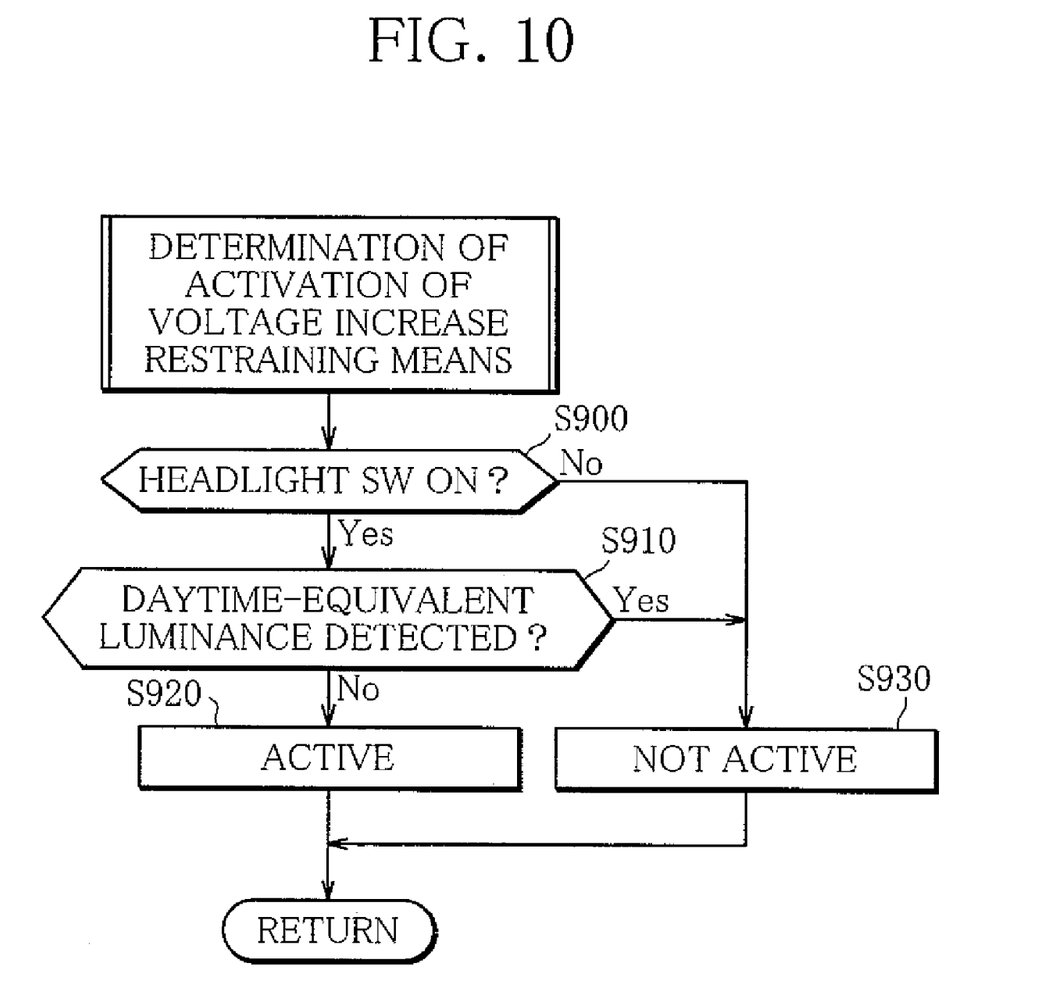
FIG. 10 is a flowchart illustrating a subroutine for determining activation of generation voltage increase restraining means.

FIG. 10 is a flowchart illustrating the subroutine for determining activation of the generation voltage increase restraining means.

Upon start of the subroutine, first in Step S900, it is determined whether or not the headlight switch 6 is ON (lighting detection means). If the headlight switch is ON, the subroutine proceeds to Step S910. In Step S910, the amount of solar radiation is acquired from the solar radiation sensor 21, and a determination is made as to whether or not the acquired solar radiation shows a daytime-equivalent luminance. If the solar radiation does not show a daytime-equivalent luminance (the solar radiation shows a nighttime-equivalent luminance), the subroutine proceeds to Step S920 in which the generation voltage increase restraining means is judged to be active, whereupon the subroutine ends.

The subroutine proceeds to Step S930 when it is judged in Step S900 that the headlight switch 6 is OFF, or when it is judged in Step S910 that the acquired solar radiation shows a daytime-equivalent luminance. In Step S930, the generation voltage increase restraining means is judged to be inactive, whereupon the subroutine ends.

As a result of the control procedure described above, the electric power generation control device of the embodiment obtains the discharged capacity "new" of the battery 2 through integration of the battery current Ibat (S410), and determines the power generation voltage of the alternator 1 in accordance with the discharged capacity "new" and the running state of the vehicle (target generation voltage Vtgt calculation subroutine). Specifically, in the cruise or accelerating state, the power generation voltage is set to 14.3 V when the discharged capacity of the battery 2 is greater than or equal to 4 Ah, and is set to a lower voltage (12.5 V or 13.5 V) when the discharged capacity is smaller than 4 Ah.

Also, when the engine 4 is started, the battery internal resistance Rbat is calculated from the starting battery current Ist and the starting battery voltage Vst (S120), and if the calculated internal resistance Rbat is higher than the discharge-discriminating internal resistance Rdis(Tmp) obtained on the basis of the battery temperature Tmp (S150), decrease of the power generation voltage (to 12.5 V or 13.5 V) is prohibited (S300). When the internal resistance Rbat is higher than the discharge-discriminating internal resistance Rdis(Tmp), a determination is made as to whether the battery is fully charged or not (whether the battery current Ibat is smaller than 3 A and at the same time the battery voltage Vbat is higher than 14 V) (S330). If the battery is judged to be fully charged, the discharged capacity "new" is initialized (S340) and the power generation voltage is allowed to decrease (S350).

Accordingly, even in cases where the charged capacity of the battery 2 has decreased due to self-discharge or due to the use of the electrical devices 3 during stoppage of the vehicle, for example, such a decrease in the charged capacity of the battery 2 can be accurately detected. Since an adequate charging voltage is secured for the battery 2, over-discharge of the battery 2 can be avoided. Also, since the discharged capacity "new" is initialized when the internal resistance of the battery 2 is higher than the predetermined value, error in the discharged capacity "new" is eliminated, making it possible to accurately control the power generation voltage thereafter.

Further, according to the embodiment, when the headlight switch 6 is ON and at the same time the detected solar radiation shows a nighttime-equivalent luminance (at nighttime), the generation voltage decrease restraining means is judged to be active (activation determination subroutine for the generation voltage decrease restraining means). If the generation voltage decrease restraining means is judged to be active (S700) when the discharged capacity "new" of the battery 2, obtained through integration of the battery current Ibat, is smaller than 4 Ah (S630), the power generation voltage is not decreased to 12.5 V but kept at 13.5 V (S650). As a consequence, fluctuation of the supply power to the headlight bulb 5 is suppressed, whereby flickering of the headlight as well as reduction in life of the headlight bulb 5 can be restrained.

In the daytime (when the detected solar radiation shows a daytime-equivalent luminance), on the other hand, the generation voltage decrease restraining means is judged to be inactive even if the headlight switch 6 is ON (activation determination subroutine for the generation voltage decrease restraining means), and decrease of the power generation voltage to 12.5 V is permitted (S660). Thus, in regions where the headlights must always be turned on, such as far-north regions, the charged capacity of the battery 2 can be kept low with the target charged capacity set to a low level, making it possible to take full advantage of the regenerative effect at the time of charging.

Also, when the headlight switch 6 is ON and at the same time the detected solar radiation shows a nighttime-equivalent luminance (at nighttime), the generation voltage increase restraining means is judged to be active (activation determination subroutine for the generation voltage increase restraining means). While the vehicle is decelerating, the power generation voltage is set to a relatively high value (14.8 V), and if the generation voltage increase restraining means is judged to be active, the effective value of the voltage applied to the headlight bulb 5 is lowered by the chopper control (S720). Consequently, flickering of the headlight as well as reduction in life of the headlight bulb 5 can be restrained, and it is also possible to reduce the power consumption of the headlight bulb 5. In the daytime, on the other hand, the generation voltage increase restraining means is judged to be inactive even if the headlight switch 6 is ON (activation determination subroutine for the generation voltage increase restraining means). Since the power generation voltage is set to a relatively high value of 14.8 V during deceleration of the vehicle (S680), the battery can be charged efficiently with the regenerative effect enhanced.

In the foregoing embodiment, the state of sunlight is directly detected by the solar radiation sensor 21 or the like. Alternatively, the state of sunlight may be estimated, for example, from the current time obtained by the timepiece and the current position obtained by a navigation system.

Also, the ECU 10 may be configured to control the chopper control means 7 in accordance with the power generation voltage such that a fixed effective voltage is applied to the headlight bulb 5. This makes it possible to more effectively restrain flickering of the headlight.

Further, a temperature sensor (headlight temperature detection means) for detecting the temperature of the headlight bulb 5 may be provided, and the ECU 10 may be adapted to control the chopper control means 7 in such a manner that, when the temperature of the headlight bulb 5 is lower than a predetermined temperature, the electric power supplied to the headlight bulb 5 is decreased over a predetermined time from the start of power supply. By suitably setting the predetermined temperature and the predetermined time, it is possible to prevent the temperature of the headlight bulb 5 from rising rapidly, because the electric power supplied to the headlight bulb 5 is decreased while the bulb temperature is low, whereby reduction in life of the headlight bulb 5 can be restrained more effectively.

What is claimed is:

1. An electric power generation control device driven by an internal combustion engine mounted on a motor vehicle, for generating electric power and determining a power generation voltage for supplying the electric power to an electrical load and electricity storage means of the vehicle, comprising:

electricity storage amount detection means for detecting an amount of electricity stored in the electricity storage means;

power generation voltage decreasing means for lowering the power generation voltage when a predetermined electricity storage amount is detected by the electricity storage amount detection means;

lighting detection means for detecting lighting of a headlight bulb of the vehicle;

sunlight state detection means for detecting a state of sunlight; and control means for restraining the power generation voltage from being lowered by the power generation voltage decreasing means if the sunlight state detected by the sunlight state detection means is equivalent to nighttime while lighting of the headlight bulb is detected by the lighting detection means, allowing the power generation voltage to be lowered by the power generation voltage decreasing means if the sunlight state detected by the sunlight state detection means is equivalent to daytime while lighting of the headlight bulb is detected by the lighting detection means, and allowing the power generation voltage to be lowered by the power generation voltage decreasing means irrespective of the sunlight state while lighting of the headlight bulb is not detected.

2. The electric power generation control device according to claim 1, further comprising:

vehicle running state detection means for detecting a running state of the vehicle;

power generation voltage increasing means for raising the power generation voltage when the running state detected by the vehicle running state detection means is a decelerating state; and supply power restraining means for restraining electric power supplied to the headlight bulb, wherein, when the sunlight state detected by the sunlight state detection means is equivalent to nighttime, the control means restrains the power generation voltage from being raised by the power generation voltage increasing means, and when the sunlight state detected by the sunlight state detection means is equivalent to daytime, the control means allows the power generation voltage to be raised by the power generation voltage increasing means and also causes the supply power restraining means to restrain the electric power supplied to the headlight bulb.

3. The electric power generation control device according to claim 2, wherein:

the supply power restraining means performs chopper control in a time-divided fashion, and the control means controls the supply power restraining means in accordance with the power generation voltage such that a time-division ratio of the chopper control is varied.

4. The electric power generation control device according to claim 2, further comprising:

temperature detection means for detecting temperature of the headlight bulb, wherein, when the detected temperature of the headlight bulb is lower than a predetermined value, the control means controls the supply power restraining means such that the electric power supplied to the headlight bulb is decreased over a predetermined time from start of power supply.

5. The electric power generation control device according to claim 3, further comprising:

temperature detection means for detecting temperature of the headlight bulb, wherein, when the detected temperature of the headlight bulb is lower than a predetermined value, the control means controls the supply power restraining means such that the electric power supplied to the headlight bulb is decreased over a predetermined time from start of power supply.

* * * * *